United States Patent Office 3,832,330
Patented Aug. 27, 1974

3,832,330
POLYMERIZATION OF TETRACARBOXYLIC ACID DERIVATIVES AND UREA OR URETHANE DERIVATIVES OF DIAMINES
David Rodney Dixon, Dunstable, John Brewster Rose, Letchworth, and Cecil Nigel Turton, Harpenden, England, assignors to Imperial Chemical Industries Limited, London, England
No Drawing. Continuation of abandoned application Ser. No. 751,768, Aug. 12, 1968. This application Oct. 18, 1971, Ser. No. 190,172
Claims priority, application Great Britain, Aug. 18, 1967, 38,220/67
Int. Cl. C08g 20/32
U.S. Cl. 260—47 CP                                                 8 Claims

ABSTRACT OF THE DISCLOSURE

Mixtures of aromatic tetracarboxylic dianhydrides and urethane or urea derivatives of aromatic diamines and soluble and fusible prepolymers obtained therefrom are useful intermediates for fabricating polyimide articles.

---

This application is a continuation of application Ser. No. 751,768, filed Aug. 12, 1968, now abandoned.

This invention relates to aromatic polymers and in particular to improvements in the production of aromatic polyimides.

As described, for example, in British patent specifications 898,651, 903,271, 903,272, 935,388, 942,025 and 1,059,929, aromatic polyimides I may be made by the condensation of aromatic tetracarboxylic dianhydrides II (or the corresponding di- or tetraesters) and aromatic diamines III in solution in a very highly polar aprotic solvent such as $N,N$-dimethylformamide or $N,N$-dimethylacetamide, when a polyamic acid IV is formed as a soluble intermediate and can be converted into the polyimide I by the elimination of water on ring-closure along the polymer chain.

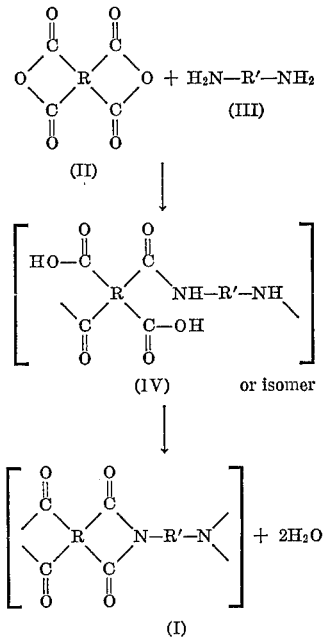

In these formulae R is a quadrivalent radical of aromatic character with the carbonyl groups of each pair in *ortho* or *peri* relationship and R' is a bivalent radical of aromatic character. R and R' may be aryl radicals derived e.g. from benzene or naphthalene but preferably at least some of the R or R' radicals along the polymer chains are the more flexible bridged aromatic radicals derived from compounds of the formula

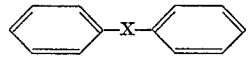

where X may be for example —O—, —S—, —SO—, —SO$_2$—, —CO—, —CO.NH— or an alkylene (e.g. —CH$_2$— or —C(CH$_3$)$_2$—) radical.

Examples of the dianhydrides are pyromellitic dianhydride, dianhydrides derived from fused aromatic systems, as in naphthalene-2,3,6,7-tetracarboxylic acid dianhydride, naphthalene-1,2,5,6-tetracarboxylic acid dianhydride, naphthalene-1,4,5,8-tetracarboxylic dianhydride, and perylene-3,4,9,10-tetracarboxylic acid dinahydride, and dianhydrides wherein the anhydride groups are attached to different benzene rings which are linked together, as in biphenyl-3,3',4,4'-tetracarboxylic acid dianhydride, biphenyl-2,2',3',3'-tetracarboxylic acid dianhydride, 2,2-bis-(3,4-dicarboxyphenyl)propane dianhydride, bis-(3,4-dicarboxyphenyl) ether dianhydride, bis-(3,4-dicarboxyphenyl) sulphone dianhydride, benzophenone-2,2',3,3'-tetracarboxylic acid dianhydride and benzophenone-3,3',4,4'-tetracarboxylic acid dianhydride. The usually preferred dianhydrides are pyromellitic dianhydride, benzophenone-3,3',4,4'-tetracarboxylic acid dianhydride and the dianhydrides of naphthalene tetracarboxylic acids.

Anhydrides of the aforementioned types but containing one or more suitable substituent groups, e.g. halogens, as in certain of the dichloro- and tetrachloro-naphthalene derivatives, may be used if desired.

Anhydrides containing heterocyclic rings of aromatic character which may be used include those derived from furane, thiophene, pyridine and pyrazine compounds, e.g. thiophene-2,3,4,5-tetracarboxylic anhydride and pyrazine-2,3,5,6-tetracarboxylic anhydride.

Examples of the diamines are *m*- and *p*-phenylenediamines, 2,2-bis-(4-aminophenyl)propane, bis-(4-aminophenyl)methane, benzidine, bis-(4-aminophenyl) sulphide, bis-(4-aminophenyl) sulphone, bis-(4-aminophenyl) ether, 1,5-diaminonaphthalene, 3,3'-dimethylbenzidine, 3,3'-dimethoxybenzidine, 4,4'-diaminobenzanilide and 2,6-diaminopyridine. Bis-(4-aminophenyl) ether and bis-(3-aminophenyl) and bis-(4-aminophenyl) sulphones are very suitable and may be used in combination if desired.

The aromatic polyimides I are generally insoluble and infusible or very high-melting even when both R and R' are bridged aromatic radicals. These properties are desirable for high-temperature applications in articles fabricated from polyimides, but the manufacture of such articles is correspondingly difficult. For many purposes fabricators use solutions of the intermediate polyamic acids IV, e.g. for casting films or spinning fibres, for coating surfaces, or for impregnating reinforcing materials or fillers, e.g. glass, asbestos or carbon fibres. However, the polyamic acids are relatively unstable, beginning to decompose above about 60° C., and the dipolar aprotic solvents usually used to dissolve them (e.g. $N,N$-dimethylacetamide) are expensive and rather toxic.

It has now been found that mixtures of (i) aromatic tetracarboxylic dianhydrides or the corresponding di- or tetra-esters and (ii) urethane or urea derivatives of aromatic diamines, and soluble and fusible prepolymers obtained by reaction of (i) and (ii), are useful intermediates for fabricating polyimide articles. The relative molar amounts of (i) and (ii) are preferably in the range 2:1 to 1:1. For example, there may be up to 50% molar excess of anhydride, but preferably the diamine derivative is not in excess.

The dianhydrides and diamines are as described above. The urethane and urea derivatives are of the general formula

Z—CO—NH—R'—NH—CO—Z' in which R' is as defined above, Z and Z' are groups of the formula —OY or —NYY', and Y and Y' are aliphatic or aromatic radicals free from terminal or pendent methylene groups, Y and Y' together with the N atom also being able to form a heterocyclic ring (e.g., pyrrolidino or piperidino).

Mixtures of the dianhydrides or di- or tetra-esters and the urethane or urea derivatives of the diamines generally melt at temperatures below 200° C. and sometimes as low as 120–130° C. (depending on the nature of the compounds concerned), and they react to give a prepolymer with evolution of carbon dioxide (as well as an alcohol or phenol from urethane groups and a secondary amine from urea groups) until up to 95% of the theoretically available carbon dioxide has been evolved. With the urethane derivatives a clear melt is usually formed at 180–200° C. With urea derivatives the reaction seems to be more rapid, and a temperature of about 120° C. may be sufficient. In principle, the reagents are heated to an adequate temperature to obtain a clear (soluble or fusible) resin without driving the reaction so far as to make the resin insoluble.

Reaction is possible in the melt (e.g. in a screw reactor), but it is often advantageous in making soluble, fusible prepolymers to form a slurry of the reagents in an inert liquid diluent such as a hydrocarbon to promote uniform heating of the reagent mixture during fusion. It is particularly convenient if the diluent is selected so that almost all of it has distilled from the reaction mixture by the time that the prepolymer formation reaction is complete. It is also possible to use for this purpose a relatively non-reactive solvent for one or both of the reagents such as a ketone or an ester (e.g. 4-methylpentan-2-one or amyl acetate). Moreover, a reactive solvent such as an alcohol may also be used. In this case part of the alcohol reacts with the dianhydride to form the di-ester and the latter reacts with the diamine derivative to form the prepolymer.

To give a soluble and still fusible prepolymer, the reaction is stopped when a relatively small amount (e.g., 5–10%) of the theoretically possible amount of carbon dioxide has been eliminated from the urethane or urea groups, since the prepolymer is then freely soluble not only in highly polar solvents such as tertiary amides (e.g. $N,N$-dimethylacetamide), sulphoxides (e.g., dimethyl sulphoxide) and sulphones (e.g., 1,1-dioxothiolan), but often also in less highly polar and less expensive solvents such as ketones and cyclic ethers (e.g., acetone, tetrahydrofuran, dioxan). Solvents of intermediate polarity, such as nitriles (e.g., acetonitrile), esters (e.g., ethyl acetate) and haloalkanes (e.g., chloroform) may also be used.

On prolonged heating especially at higher temperatures more carbon dioxide is evolved and insoluble polyimides are formed. Heating for an hour at 220° C. may be sufficient to give a product solid at that temperature; but further thermal curing, as for the polyamic acid products described for example in the above-mentioned British patent specifications, is desirable in order to achieve full development of the characteristic resistant properties of the polyimides.

It is possible that some reaction occurs before carbon dioxide is evolved, because the reagent mixtures become yellow immediately on melting even at 130° C., perhaps giving some units of a structure such as

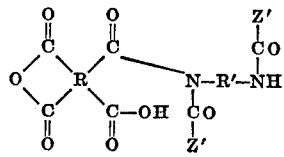

and similarly constituted oligomers. There is an indication from infra-red spectroscopy that some anhydride rings may still be present in the freely soluble prepolymers. However, the practical utility of the prepolymers does not rest on the accuracy of such suggestions concerning the chemical pathways involved.

The presence of some insoluble polyimide fraction in the soluble prepolymer is not necessarily undesirable, as it acts as a filler in the intermediate stages and ultimately reinforces the final fabricated article.

The lower the molecular weight of the radicals Z and Z' the more rapid is the reaction to form the prepolymer and then the polyimide. For this reason urethanes and ureas of the formulae $CH_3O$—CO—NH—R'—NH—CO—$OCH_3$ $C_2H_5O$—CO—NH—R'—NH—CO—$OC_2H_5$ and $(CH_3)_2N$—CO—NH—R'—NH—CO—$N(CH_3)_2$ are generally preferred (the meaning of R' and the examples and preferences therefor being as described above for the diamines $H_2N$—R'—$NH_2$). However, it is sometimes desirable to retard the completion of polyimide ring-closure, for example, to retain the coherence of the article during the curing step, and for this purpose at least some of the radicals Z and Z' may be of higher molecular weight. The phenols, higher alcohols, or higher secondary amines released from such urethane or urea groups may also have an advantageous plasticising effect on the prepolymer during its conversion into polyimide. Thus urethanes and ureas containing higher groups such as phenoxy, isooctyloxy and dibutylamino may be used, and can be mixed in any desired proportion with the quicker-reacting lower urethanes and ureas.

The molten prepolymers and even the molten mixtures of dianhydrides and urethanes or ureas according to the invention can be used directly for impregnating and coating or for forming into shaped articles prior to the curing step yielding polyimides. The fusible materials may be used for moulding, and fillers can be incorporated if desired with the initial reagents or be added to the prepolymer when molten or in solution in a volatile solvent. In this way, for example, preformed polyimide powder can be added as filler and brought into a mouldable state, and structurally reinforcing fillers such as glass, asbestos and carbon or metal fibres may be added. Abrasives or solid lubricants (e.g., graphite and molybdenum disulphide) may be used as fillers to produce polyimide articles to serve as high temperature abrasives or self-lubricating bearings respectively.

The prepolymers are also useful in solution for casting, coating or impregnating or for incorporating fillers. Conveniently the prepolymer obtained after about 5–10% evolution of carbon dioxide is dissolved at 10–20% solids. When a volatile and inexpensive solvent is required acetone is particularly suitable. For some purposes, e.g., in wire-coating, a relatively non-volatile solvent like 1-methyl-2-oxopyrrolidine is of assistance and may then be used either alone or mixed with more volatile cosolvents.

The evolution from the prepolymers of carbon dioxide and other non-corrosive volatile materials such as alcohols during the curing step affords a simple route to polyimide foams which are valuable high-temperature insulating materials.

The prepolymers or simply mixtures of the dianhydrides or di- or tetra-esters and urethanes or ureas according to the invention may be partly cured by heating such that most of the volatile material (70–95%) has been evolved. The solid formed may then be milled to a fine powder and the latter moulded at room temperature or a slightly elevated temperature and high pressures (up to 700 mn./$m^2$ for example). The mouldings formed are strong enough for easy handling and may be sintered by heating in a free state, when they develop their full strength.

The urethanes and ureas for the invention are readily accessible by the reaction of diisocyanates

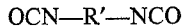
OCN—R'—NCO with aliphatic or aromatic hydroxy compounds HOY or secondary amines HNYY'. Alternatively the diamines $H_2N$—R'—$NH_2$ can react with chloroformic esters

Cl—CO—OY to give the urethanes directly.

The following examples illustrate the invention.

EXAMPLE 1

An equimolar mixture of benzophenone-3,3',4,4'-tetracarboxylic dianhydride (8.7 g.; 0.0270 mole) and bis-(4-isopropoxycarbonylaminophenyl)methane

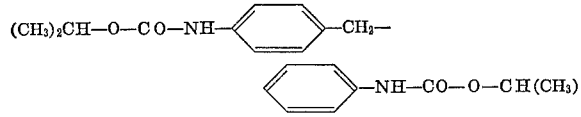

(10.0 g.; 0.0270 mole) was made by grinding the two solids together and melted at 145–150° C. The mixture was fused at 170° C. and the temperature was raised during 20 minutes to 200° C. Gas began to be evolved at about 190° C. The temperature was held at 200–210° C. for 20 minutes; then the amber liquid was poured from the reaction flask and set to a brittle yellow solid. This prepolymer was freely soluble in acetone, and it was used to impregnate glass cloth which after pressing at 300° C. for 40 minutes under 10–20 mn./m.² gave a strong non-porous cured glass-filled polyimide product.

EXAMPLE 2

The procedure of Example 1 was repeated using 0.1 mole of each reagent and rasing the temperature from 170° C. to 220° C. over 1 hour (it was above 210° C. for about 12 minutes). The prepolymer was much less soluble in acetone than the product of Example 1 (less than 5%), but was freely soluble in $N,N$-dimethylacetamide. Analysis of the carbon dioxide (0.011 mole) and isopropanol (0.013 mole) evolved indicated about 6% conversion, calculated on the theoretically possible total from the urethane.

EXAMPLE 3

A mixture of benzophenone-3,3',4,4'-tetracarboxylic dianhydride (103 g.; 0.32 mole) and bis-(4-ethoxycarbonylaminophenyl)methane (109.4 g.; 0.32 mole) was ground thoroughly in a mortar and fused under nitrogen. The temperature of the melt was raised to 200° C. and held at this level for 5 minutes and then the liquid was poured from the reaction flask and cooled. A brittle amber resin (191.5 g.) was obtained and this readily gave 30% w./w. solutions in acetone, tetrahydrofuran, and 1-methyl-2-oxopyrolidine.

EXAMPLE 4

A resin was prepared from pyromellitic dianhydride (72.7 g.; 0.33 mole) and bis-(4-ethoxycarbonylaminophenyl)methane (114 g.; 0.33 mole) as described in Example 3. The brittle reddish-amber solid obtained (163.0 g.) readily gave 30% w./w. solutions in acetone, tetrahydrofuran, methyl formate, acetonitrile, and 1-methyl-2-oxopyrolidine.

EXAMPLE 5

A mixture of pyromellitic dianhydride (145.3 g.; 0.67 mole) and bis-(4 - ethoxycarbonylaminophenyl)methane (114 g.; 0.33 mole) was ground thoroughly in a mortar and fused under nitrogen. The melt was heated to 200° C. and held at this temperature for 10 minutes to obtain a clear melt, which was poured from the reaction flask and cooled. The reddish-amber resin obtained (214.6 g.) readily gave a 30% w./w. solution in 1-methyl-2-oxopyrolidine.

EXAMPLE 6

A resin was prepared from pyromellitic dianhydride (72.7 g.; 0.33 mole), benzophenone - 3,3',4,4'-tetracarboxylic dianhydride (53.6 g.; 0.17 mole) and bis-(4-ethoxycarbonylaminophenyl)methane (114 g.; 0.33 mole) as described in Example 3. The reddish-amber resin obtained (187 g.) readily gave 30% w./w. solutions in acetone, tetrahydrofuran, and 1-methyl-2-oxopyrolidine.

EXAMPLE 7

A resin was prepared from benzophenone-3,3',4,4'-tetracarboxylic dianhydride (107.3 g.; 0.33 mole) and 1,3-di(ethoxycarbonylamino)benzene

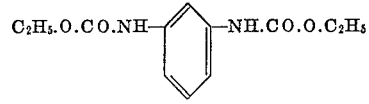

(84.0 g.; 0.33 mole) as described in Example 3. The brown resin obtained (173.7 g.) gave 30% w./w. solutions in acetone, tetrahydrofuran, methyl formate, acetonitrile, and 1-methyl-2-oxopyrolidine.

EXAMPLE 8

A resin was prepared from pyromellitic dianhydride (72.7 g.; 0.33 mole) and 1,3-di(ethoxycarbonylamino)benzene (84.0 g.; 0.33 mole) as described in Example 3. The blood-red resin obtained (141.2 g.) gave 30% w./w. solutions in acetone and tetrahydrofuran.

EXAMPLE 9

A resin was prepared from benzophenone-3,3',4,4'-tetracarboxylic dianhydride (107.3 g.; 0.33 mole) and bis-(4-ethoxycarbonylaminophenyl) ether

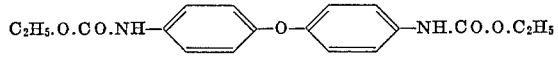

(115 g.; 0.33 mole) as described in Example 3. The brown resin obtained (189.3 g.) gave 30% w./w. solutions in tetrahydrofuran and 1-methyl-2-oxypyrrolidine.

EXAMPLE 10

A resin was prepared from pyromellitic dianhydride (73 g.; 0.33 mole) and bis-(4-ethoxycarbonylaminophenyl) ether (115 g.; 0.33 mole) as described in Example 3. The blood-red resin obtained (176 g.) gave 30% w./w. solutions in tetrahydrofuran and 1-methyl-2-oxopyrolidine.

EXAMPLE 11

A slurry of benzophenone-3,3',4,4'-tetracarboxylic dianhydride (107.3 g.; 0.33 mole) and bis-(4-ethoxycarbonylaminophenyl)methane (114 g.; 0.33 mole) in 4-methylpentan-2-one (200 cm.³) was stirred and heated under nitrogen with the solvent removed rapidly by distillation. When removal of the solvent was almost complete, the temperature of the reaction mixture was raised to 200° C. and kept there for 5 minutes. The melt was then poured out and cooled to an amber resin (212.4 g.), which readily gave 30% w./w. solutions in acetone, tetrahydrofuran, acetonitrile, and 1-methyl-2-oxopyrolidine.

EXAMPLE 12

A resin was prepared as described in Example 11 and with the same reagents except that amyl acetate (200 cm.³) was used instead of 4-methylpentan-2-one. The amber resin obtained (222 g.) readily gave 30% w./w. solutions in acetone, tetrahydrofuran, and 1-methyl-2-oxopyrolidine.

EXAMPLE 13

A resin was prepared as described in Example 11 and with the same reagents except that butan-1-ol (200 cm.³)

was used instead of 4-methylpentan-2-one. The pale amber resin obtained (241.9 g.) readily gave 30% w./w. solutions in acetone, tetrahydrofuran, and 1-methyl-2-oxypyrrolidine.

EXAMPLE 14

A resin was prepared as described in Example 11, using benzophenone-3,3',4,4'-tetracarboxylic dianhydride (107 g.; 0.33 mole), bis-(4-isopropoxycarbonylaminophenyl)methane (123 g.; 0.33 mole), and m-xylene (236 cm.$^3$). The amber resin obtained (190 g.) readily gave 30% w./w. solutions in acetone, tetrahydrofuran, and 1-methyl-2-oxopyrrolidine.

EXAMPLE 15

A mixture of benzophenone-3,3',4,4'-tetracarboxylic dianhydride (107 g.; 0.33 mole) and 2,4-bis-($N'$,$N'$,-di-n-propylureido)toluene

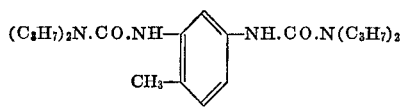

(102 g.; 0.33 mole) was ground thoroughly in a mortar and fused under nitrogen. The mixture was heated to 120° C. and then allowed to cool. The resin obtained (197 g.) readily gave a 30% w./w. solution in 1-methyl-2-oxopyrrolidine, a 20% solution in tetrahydrofuran, and a 15% solution in acetone.

EXAMPLE 16

A resin was prepared as described in Example 11, using benzophenone-3,3',4,4'-tetracarboxylic dianhydride (64.4 g.; 0.20 mole), bis - (4 - ethoxycarbonylaminophenyl) sulphone

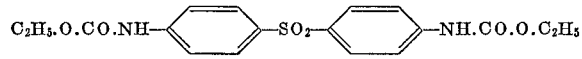

(78.4 g.; 0.2 mole), and butan-1-ol (150 cm.$^3$). The amber resin obtained (147 g.) readily gave a 30% w./w. solution in 1-methyl-2-oxopyrrolidine.

EXAMPLE 17

A mixture of benzophenone-3,3',4,4'-tetracarboxylic dianhydride (1030 g.; 3.2 mole) and bis-(4-ethoxycarbonylaminophenyl)methane (1094 g.; 3.2 mole) was ground thoroughly in a mortar and fed through a glass screw reactor at 200° C. The mixture fused and a clear amber resin flowed from the reactor. The estimated dwell time of the reaction mixture in the reactor was 5–10 minutes. The brittle amber resin obtained (2064 g.) readily gave a 30% w./w. solution in acetone.

EXAMPLE 18

A sample (665 g.) of resin prepared as described in Example 17 was heated in nitrogen at 300° C. for 40 minutes. The solid brown mass obtained (532.5 g.) was cooled, ground in a mortar, and sieved (aperture size 0.045 mm.). Samples (1.0 each) of the fine powder obtained were pressed into discs 19 mm. in diameter in a hardened steel mould at room temperature and pressures up to 700 mn./m.$^2$. The pressure was raised to the maximum level over a period of 3 minutes, held at this level for 5 minutes, and then released.

The discs obtained in this way were strong and readily handled and were sintered by heating in a free state in air from 80° C. to 350° C. over a period of 9 hours. Strong brown mouldings were obtained in this way and their shear strengths were determined by a punch and die technique with a cylindrical punch 3.2 mm. in diameter.

| Compacting pressure, mn./m.$^2$ | Weight loss during sintering, percentage | Density of disc after sintering, g./cm.$^3$ | Shear strength of final moulding mn./m.$^2$ |
| --- | --- | --- | --- |
| 275 | 6.4 | 1.26 | 64.1 |
| 410 | 6.4 | 1.29 | 71.7 |
| 550 | 6.2 | 1.30 | 78.6 |
| 690 | 6.6 | 1.31 | 84.1 |

EXAMPLE 19

A mixture of bis-(4-ethoxycarbonylaminophenyl)methane (10.9 g.; 0.032 mole) and benzophenone-3,3',4,4'-tetracarboxylic dianhydride (10.3 g.; 0.032 mole) was ground thoroughly in a mortar and then heated at 300° C. for 40 minutes in air. The brown solid obtained (14.7 g.) was ground in a mortar and sieved through a sieve of aperture size 0.045 mm.

Samples (1 g. each) of the fine powder obtained were pressed into discs at 700 mn./m.$^2$ and these sintered as described in Example 18. The density of the discs was 1.07 g./cm.$^3$ and their shear strength was 34.2 mn./m.$^2$.

EXAMPLE 20

An asbestos felt was prepared by dispersing 60–70 g. of white asbestos fibre (chrysotile) in about 3 litres of water and filtering the resultant slurry through a fine stainless steel gauze (18 cm. x 36 cm.). The wet felt obtained was dried first at 50–60° C. and finally at 200° C. for 18 hours.

The rough edges were trimmed from the felt to give a mat which weighed 63.0 g. This mat was impregnated with 63.0 g. of resin prepared as described in Example 3, dissolved in 150 cm.$^3$ of acetone and dried off at room temperature. The impregnated mat was then precured at 200° C. for 60 minutes.

Rectangles (15 cm. x 5 cm.) were cut from the moulding mat obtained and four such rectangles weighing 45 g. were placed in a semipositive steel mould (15 cm. x 5 cm.) and pressed at 25 mn./m.$^2$ and 225° C. for 20 minutes and then the temperature was raised to 300° C. for a further 20 minutes. The moulding was cooled in the press and postcured by heating in a free state in air from 80° C. to 350° C. over 90 hours.

The strong coherent brown moulding obtained measured 14.95 cm. by 5.00 cm. by 0.33–0.36 cm.

EXAMPLE 21

A resin was prepared from benzophenone-3,3',4,4'-tetracarboxylic dianhydride (483 g.; 1.5 mole) and bis-(4-isopropoxycarbonylaminophenyl)methane (555 g.; 1.5 mole) as described in Example 3 and ground to a fine powder. A mixture of this resin powder (50 g.) and fine white asbestos (50 g.) was blended thoroughly, acetone (300 cm.$^3$) was added, and the paste was left to dry in air. The solid lumps obtained were precured at 200° C. for 30 minutes, cooled, powdered, and passed through a sieve of aperture size 0.5 mm.

A sample of the moulding powder (49 g.) was moulded to a 15 cm. x 5 cm. plaque and the latter was postcured as described in Example 20. The strong coherent moulding obtained had a flexural modulus of 13.3 gn./m.$^2$.

EXAMPLE 22

A layer of aligned carbon fibre (Courtaulds type B, 27 g.) was impregnated with resin (30 g.), prepared as described in Example 1, dissolved in acetone (100 cm.$^3$). The mat was dried in air and precured at 200° C. for 30 minutes.

Pieces of the impregnated mat obtained were arranged in a 15 cm. x 5 cm. semipositive steel mould with the fibre directions alternately longitudinal and transverse. The sample was then compression moulded at 210° C. and 2.8 mn./m.$^2$ for 20 minutes and then 300° C. and 6.2 mn./m.$^2$ for a further 20 minutes. The moulding was postcured by heating from 280° C. to 400° C. over 2 hours and keeping it at 400° C. for 30 minutes. The final moulding obtained was strong and coherent and contained approximately 62 weigh percent of carbon fibre. The flexural modulus was 114 gn./m.$^2$.

EXAMPLE 23

Glass cloth (19 g.) was impregnated with resin (30. g.), prepared as described in Example 1, dissolved in acetone (50 cm.$^3$). The mat was dried in air and then precured at 200° C. for 30 minutes. Pieces of the impregnated mat obtained were cut to fit a 15 cm. x 5 cm. semi-positive steel mould and pressed at 210° C. and 2.8 mn./m.$^2$ for 67 minutes and then 300° C. and 6.2 mn./m.$^2$ for 20 minutes. The molding was postcured as described in Example 22. The final moulding was strong and coherent.

The invention has been described above with reference to mixtures of (i) aromatic tetracarboxylic dianhydrides or the corresponding di- or tetra-esters and (ii) urethane or urea derivatives of aromatic diamines, and soluble and fusible prepolymers obtained by reaction of (i) and (ii). According to the invention, the mixtures of (i) and (ii) as described above may be replaced wholly or in part by urethane or urea derivatives of amino-aromatic dicarboxylic anhydrides

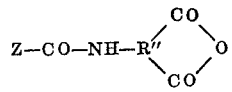

or the correpsonding mono- or di-esters; in this formula Z is as defined above and R" is a tervalent radical of aromatic character with the carbonyl groups in *ortho* or *peri* relationship similar to the radicals R and R' as described above (for preference at least some being the bridged aromatic radicals). For example, 4-ethoxycarbonylaminophthalic anhydride and 4-(4-ethoxycarbonylaminophenoxy)phthalic anhydride may be used.

We claim:

1. A polymerizable substance comprising a mixture of (i) an aromatic tetracarboxylic dianhydride of formula

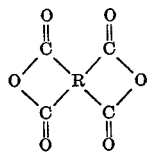

or a corresponding di- or tetra-ester and (ii) a urethane or urea derivative of an aromatic diamine of the general formula

Z—CO—NH—R'—NH—CO—Z' in which R is a quadrivalent aromatic radical with the carbonyl groups in ortho or peri relationship, R' is a bivalent aromatic radical, Z and Z' are groups of the formula —OY or —NYY', and Y and Y' are selected from aliphatic or aromatic radicals free from terminal or pendent methylene groups or Y and Y' together with the N atom form a pyrrolidino or piperidino ring.

2. A polymerizable substance according to claim 1 in which at least some of the R and R' radicals are bridged aromatic radicals selected from radicals of the formula

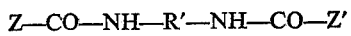

where X is —O—, —S—, —SO—, —SO$_2$—, —CO—, —CO.NH—, —CH$_2$— or —C(CH$_3$)$_2$—.

3. A polymerizable substance according to claim 1 in which the dianhydride is selected from the group consisting of pyromellitic dianhydride, benzophenone-3,3',4,4'-tetracarboxylic dianhydride and mixtures thereof.

4. A polymerizable substance according to claim 1, which is a fusible equimolar mixture of an aromatic tetracarboxylic dianhydride and a urethane or urea derivative of an aromatic diamine.

5. A cured insoluble and infusible polymeric material obtained by further heating of a prepolymer as claimed in claim 1.

6. A cured insoluble and infusible polymeric material obtained by further heating of a prepolymer as claimed in claim 1 in which the prepolymer is a soluble or fusible prepolymer obtained from a fusible equimolar mixture of an aromatic tetracarboxylic dianhydride and a urethane or urea derivative of an aromatic diamine.

7. A polymerizable substance comprising a soluble or fusible prepolymer obtained by reaction of (a) a mixture of (i) an aromatic tetracarboxylic dianhydride of formula

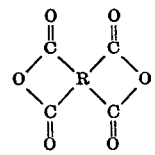

or a corresponding di- or tetra-ester and (ii) a urethane or urea derivative of an aromatic diamine of the general formula

Z—CO—NH—R'—NH—CO—Z' in which R is a quadrivalent aromatic radical with the carbonyl groups in ortho or peri relationship, R' is a bivalent aromatic radical, Z and A' are groups of the formula —PY or —NYY', and Y and Y' are selected from aliphatic and aromatic radicals free from terminal or pendent methylene groups or Y and Y' together with the N atom form a pyrrolidino or piperidino ring.

8. A polymerizable substance according to claim 7 in which at least some of the R and R' radicals are bridged aromatic radicals selected from radicals of the formula

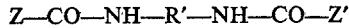

where X is —O—, —S—, —SO—, —SO$_2$—, —CO—, —CO.NH—, —CH$_2$— or —C(CH$_3$)$_2$—.

References Cited

UNITED STATES PATENTS

| | | | |
|---|---|---|---|
| 3,560,446 | 2/1971 | Zecher et al. | 260—77.5 |
| 3,179,614 | 4/1965 | Edwards | 260—30.2 |
| 3,179,634 | 4/1965 | Edwards | 260—78 |
| 3,414,546 | 12/1968 | Werntz | 260—78 |
| 3,450,678 | 6/1969 | Rogers | 260—78 |

LESTER L. LEE, Primary Examiner

U.S. Cl. X.R.

117—128, 161 P; 161—197, 205, 214, 227; 260—30.4 N, 30.8 R, 30.80 S, 31.2 N, 32.4, 32.6 N, 32.8 N, 33.2 R, 33.8 R, 47 CZ, 47 CB, 63 N, 65, 77.5 R, 78 TF